Patented Feb. 12, 1946

2,394,796

UNITED STATES PATENT OFFICE 2,394,796

HYDROCARBON CONVERSION

Milton M. Marisic, Woodbury, N. J., assignor to Socony-Vacuum Oil Company, Incorporated, a corporation of New York No Drawing. Application October 8, 1943,
Serial No. 505,541

4 Claims. (Cl. 196—52)

This invention relates to a catalyst for conversion of hydrocarbons and is particularly concerned with a novel composition of alumina and silica adapted for catalytic conversions of hydrocarbons, such as, for example, cracking of gas oils and the like, to produce gasoline.

Silica-alumina catalysts have been prepared by a large variety of processes. The methods known prior to this invention have all involved precipitation of oxides from aqueous solutions and require handling of large quantities of material because of the high proportion of water present. The water must be removed during preparation of the catalyst, thus preventing drying problems of major importance. I have now prepared a catalyst by a process avoiding these difficulties. These novel catalysts are unusual in the relatively high proportion of alumina present in the preferred types.

This invention has for its purpose a simple method of preparing alumina-silica catalysts suitable for hydrocarbon conversions by impregnating porous active forms of substantially dry alumina with organic or inorganic compounds of silicon which are readily hydrolyzed by water to yield silica. Such hydrolyzable compounds are salts of silicon of which the halides are typical and organosilicates, for example, the silicate esters.

Aluminum oxide in its various crystalline modifications has been used extensively as a catalyst supporting material or carrier. In the catalysts of this invention, alumina is an essential component and is not a carrier for the silica, since the latter alone is inactive and only combinations of silica and alumina yield catalysts active in hydrocarbon conversions. The following forms of alumina when properly dried were found to be porous and active components for preparing the catalysts of the present invention: alumina gel; gelatinous precipitate of alumina; bauxite, $Al_2O_3.H_2O$; hydrogillite, $Al_2O_3.3H_2O$; and bohmite, $Al_2O_3.H_2O$. Inactive forms of alumina which are non-porous and unsatisfactory as components for the alumina-silica catalysts are, for example, alpha alumina, corundum and diaspore, $Al_2O_3.H_2O$.

The active forms of alumina noted above are heated at about 350° F. until substantially anhydrous and then soaked in such compounds as silicon tetrachloride or tetraethyl silicate. The quantity of the silicon compound adsorbed on the alumina can be controlled readily by dilution of the former with non-aqueous solvents. When the alumina has been soaked for a sufficient length of time to obtain the desired impregnation, the liquid is poured off and the alumina is treated with water to hydrolyze the silicon compound adsorbed thereon. Acids catalyze the hydrolysis of organosilicates, hence, dilute aqueous acid solutions may be used to accelerate the hydrolysis process. The silica impregnated alumina is ready for use as a hydrocarbon conversion catalyst as soon as it has been dried and heated to the temperature at which it is to be used in the catalytic process.

Porous active alumina need not be completely dehydrated prior to treatment with the hydrolyzable silicon compound, but the dehydration may be so regulated that the water adsorbed on the alumina surfaces will hydrolyze the silicon compound and thus be replaced by silica.

The amount of silica combined with alumina may vary over a considerable range, for example, catalysts having molar ratios of silica to alumina of from 1:1 to 1:50 are active in cracking hydrocarbon oils. Not all combinations have the same catalytic activity at the same operating condition, however, the lower activity of some catalysts may be compensated for by increasing the temperature, pressure, or reaction time. The preferred catalysts of this invention have molar ratios of silica to alumina ranging from 1:4 to 1:20.

Alumina manufacture by the Aluminum Ore Company and known to the trade as "Activated Alumina" was heated in an oven at 400° F. for four hours. Five hundred cubic centimeters of 8 to 14 mesh size granules of this alumina were soaked over night in a 25% ethyl silicate, $(C_2H_5)_4SiO_4$, solution in acetone. The alumina was drained free of the silicate solution and then immersed in water for several hours, dried and heated to 1000° F. at which temperature it was maintained for two hours. The alumina-silica catalyst was tested in the cracking of a fraction of Oklahoma City gas oil boiling between 470° and 708° F. The oil was conducted through the catalyst bed at a liquid space velocity of 1.5 and a temperature of 800° F. Thirty-three per cent of the oil charged was converted to gasoline having a 410° F. endpoint.

I claim:

1. A process for conversion of high-boiling hydrocarbons to gasoline by catalytic cracking which comprises contacting said hydrocarbons under conversion conditions of temperature and pressure with a solid catalytic composition prepared by a method of combining silica and alumina which consists of impregnating substantially anhydrous porous active alumina with a hydrolyzable compound of silicon which yield silicon dioxide on hydrolysis and hydrolyzing said compound within the porous alumina structure; the molar ratio of silica to alumina in said composition being between about 1:1 and about 1:50.

2. A process for conversion of high-boiling hydrocarbons to gasoline by catalytic cracking which comprises contacting said hydrocarbons under conversion conditions of temperature and pressure with a solid catalytic composition prepared by a method of combining silica and alumina which consists of impregnating substantially anhydrous porous active alumina with a hydrolyzable compound of silicon which yields silicon dioxide on hydrolysis and hydrolyzing said compound within the porous alumina structure; the molar ratio of silica to alumina in said composition being between about 1:4 and about 1:20.

3. A process for conversion of high-boiling hydrocarbons to gasoline by catalytic cracking which comprises contacting said hydrocarbons under conversion conditions of temperature and pressure with a solid catalytic composition prepared by a method of combining silica and alumina which consists of impregnating substantially anhydrous porous active alumina with ethyl silicate and hydrolyzing said silicate within the porous alumina structure; the molar ratio of silica to alumina in said composition being between about 1:1 and about 1:50.

4. A process for conversion of high-boiling hydrocarbons to gasoline by catalytic cracking which comprises contacting said hydrocarbons under conversion conditions of temperature and pressure with a solid catalytic composition prepared by a method of combining silica and alumina which consists of impregnating substantially anhydrous porous active alumina with ethyl silicate and hydrolyzing said silicate within the porous alumina structure; the molar ratio of silica to alumina in said composition being between about 1:4 and about 1:20.

MILTON M. MARISIC.